US012420387B2

(12) United States Patent
Barzelay

(10) Patent No.: US 12,420,387 B2
(45) Date of Patent: Sep. 23, 2025

(54) CONTINUOUS ROTATION TORQUE WRENCH

(71) Applicant: TECH PATENTS LLC, Paramus, NJ (US)

(72) Inventor: Abraham Barzelay, Paramus, NJ (US)

(73) Assignee: TECH PATENTS LLC, Paramus, NJ (US)

(*) Notice: Subject to any disclaimer, the term of this patent is extended or adjusted under 35 U.S.C. 154(b) by 0 days.

(21) Appl. No.: 15/469,160

(22) Filed: Mar. 24, 2017

(65) Prior Publication Data

US 2018/0272512 A1 Sep. 27, 2018

(51) Int. Cl.

| | |
|---|---|
| ***B25B 23/00*** | (2006.01) |
| ***B25B 17/02*** | (2006.01) |
| ***B25B 21/02*** | (2006.01) |
| ***B25F 3/00*** | (2006.01) |
| ***B25F 5/00*** | (2006.01) |
| ***B25F 5/02*** | (2006.01) |

(52) U.S. Cl.

CPC .......... *B25B 23/0007* (2013.01); *B25B 17/02* (2013.01); *B25B 21/02* (2013.01); *B25F 3/00* (2013.01); *B25F 5/001* (2013.01); *B25F 5/02* (2013.01)

(58) Field of Classification Search

CPC ............................ B25B 23/0007; B25B 17/02

See application file for complete search history.

(56) References Cited

U.S. PATENT DOCUMENTS

| | | | | | |
|---|---|---|---|---|---|
| 2,510,483 A | * | 6/1950 | Schnepel | B25B 17/00 | 475/270 |
| 2,808,749 A | * | 10/1957 | Lampke | B25B 13/467 | 81/57.13 |
| 3,430,510 A | * | 3/1969 | Hendrickson | B25B 23/14 | 74/425 |
| 3,472,083 A | * | 10/1969 | Schnepel | B25B 17/00 | 475/270 |
| 3,659,299 A | * | 5/1972 | Davidson | B63C 11/52 | 441/31 |
| 4,362,072 A | * | 12/1982 | Tillman | B25B 17/02 | 81/57.13 |
| 4,374,480 A | * | 2/1983 | Diaz | B25B 13/481 | 74/421 R |
| 4,426,895 A | | 1/1984 | Lack | | |
| 4,627,310 A | | 12/1986 | Coburn | | |
| 4,827,809 A | * | 5/1989 | Broemel, Jr. | B25B 13/481 | 81/57.13 |

(Continued)

FOREIGN PATENT DOCUMENTS

CN 204868664 U 12/2015

OTHER PUBLICATIONS

International Search Report and Written Opinion issued Jul. 2, 2018, in PCT/US2018/024018 (9 pages).

*Primary Examiner* — Hadi Shakeri

(57) ABSTRACT

A torque wrench is disclosed for use in rotating a fastener. The torque wrench may include an input end configured to receive a torsional input, a housing, and a gear train disposed inside the housing and operatively driven by the torsional input. The torque wrench may also include a torque multiplier disposed inside the housing and connected to the gear train, and an output end operatively driven by the gear train to produce a torsional output.

15 Claims, 5 Drawing Sheets

(56) References Cited

U.S. PATENT DOCUMENTS

| | | | | | |
|---|---|---|---|---|---|
| 4,827,810 | A | * | 5/1989 | Rushanan | B25B 21/00 81/57.13 |
| 5,334,013 | A | * | 8/1994 | Meller | A61C 1/05 415/904 |
| 5,709,136 | A | | 1/1998 | Frenkel | |
| RE35,842 | E | * | 7/1998 | Ehlert | F16N 7/32 184/104.1 |
| 5,887,493 | A | * | 3/1999 | Main | B25B 13/463 81/57.29 |
| 6,065,580 | A | * | 5/2000 | Kirk | B60B 27/023 192/217.3 |
| 6,165,096 | A | | 12/2000 | Seith | |
| 6,260,443 | B1 | * | 7/2001 | Spirer | B25B 13/463 81/57.3 |
| 6,305,236 | B1 | | 10/2001 | Sturdevant | |
| 6,305,246 | B1 | * | 10/2001 | Horvath | B25B 13/461 81/57.39 |
| 6,822,187 | B1 | * | 11/2004 | Hermann | B23K 26/0884 219/121.63 |
| 6,923,094 | B1 | * | 8/2005 | Marquardt | B23Q 5/045 81/177.8 |
| 7,017,916 | B2 | * | 3/2006 | Sayers | F16J 15/3464 277/543 |
| 2004/0093990 | A1 | | 5/2004 | Wojtynek | |
| 2006/0096421 | A1 | | 5/2006 | Wexler | |
| 2008/0098856 | A1 | | 5/2008 | Ha | |
| 2012/0103142 | A1 | | 5/2012 | Sroka | |
| 2012/0297939 | A1 | | 11/2012 | Spata | |
| 2013/0062090 | A1 | | 3/2013 | Winnard | |
| 2015/0174741 | A1 | | 6/2015 | Frank | |

* cited by examiner

CONTINUOUS ROTATION TORQUE WRENCH

TECHNICAL FIELD

The present disclosure is directed to a torque wrench and, more particularly, to a torque wrench having a continuous rotational drive.

BACKGROUND

A torque wrench is a tool designed to exert torque on a fastener (e.g., on a bolt head or nut having specially designed inner and/or outer surfaces) to loosen or tighten the fastener. In some embodiments, the torque wrench is powered. For example, the torque wrench can be hydraulically, pneumatically, or electrically powered. In other examples, the torque wrench is manually manipulated.

Conventional torque wrenches are ratchet-type wrenches, wherein a reciprocating motion (e.g., of an internal piston) causes the fastener to rotate through a narrow angle (e.g., through about 25°/stroke of the piston). After this rotation, the ratchet must be reset (i.e. the piston must return to its starting point), before the reciprocating motion can again cause the fastener to move through another rotational segment.

Although conventional torque wrenches may be acceptable for some applications, they can also be problematic. For example, the interrupted movement of fastener rotation due to the reciprocation of the piston may result in slow fastener rotation. The reciprocating motion of the piston may also resulting in hammering within the wrench that generates undesired vibrations and is noisy. In addition, conventional torque wrenches may be useful only under particular conditions (e.g., within dry and/or clean ambient conditions) and require frequent servicing (e.g., for cleaning and to top off or replace internal lubrication).

The torque wrench of the present disclosure solves one or more of the problems set forth above and/or other problems of the prior art.

SUMMARY

One aspect of the present disclosure is directed to a torque wrench. The torque wrench may include an input end configured to receive a torsional input, a housing, and a gear train disposed inside the housing and operatively driven by the torsional input. The torque wrench may also include a torque multiplier disposed inside the housing and connected to the gear train, and an output end operatively driven by the gear train to produce a torsional output.

Another aspect of the present disclosure is directed to another torque wrench. This torque wrench may include a positively pressurized housing, and a pinion bevel gear disposed inside the positively pressurized housing and having a shaft configured to receive a rotational input. The torque wrench may also include a crown bevel gear disposed inside the positively pressurized housing and engaged with the pinion bevel gear, and a drive fitting operatively connected to the crown bevel gear.

Another aspect of the present disclosure is directed to yet another torque wrench. This torque wrench may include an input end configured to receive a continuous rotational input in a first direction, and an output end operatively engaged with the input end. The output end may be configured to produce a continuous rotational output in a second direction substantially orthogonal to the first direction. The torque wrench may further include a housing configured to receive the input and output ends, and a valve connected to the housing and configured to pass pressurized lubrication unidirectionally into the housing.

DETAILED DESCRIPTION

Figure 1:
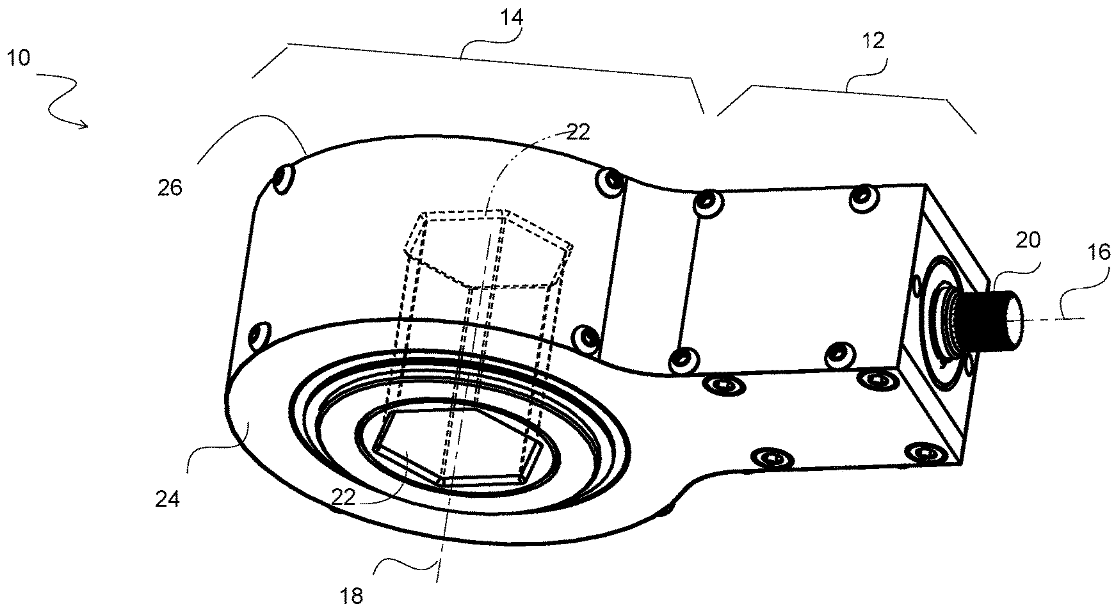
FIGS. 1 and 2 are isometric illustrations of exemplary disclosed torque wrenches.
Figure 2:
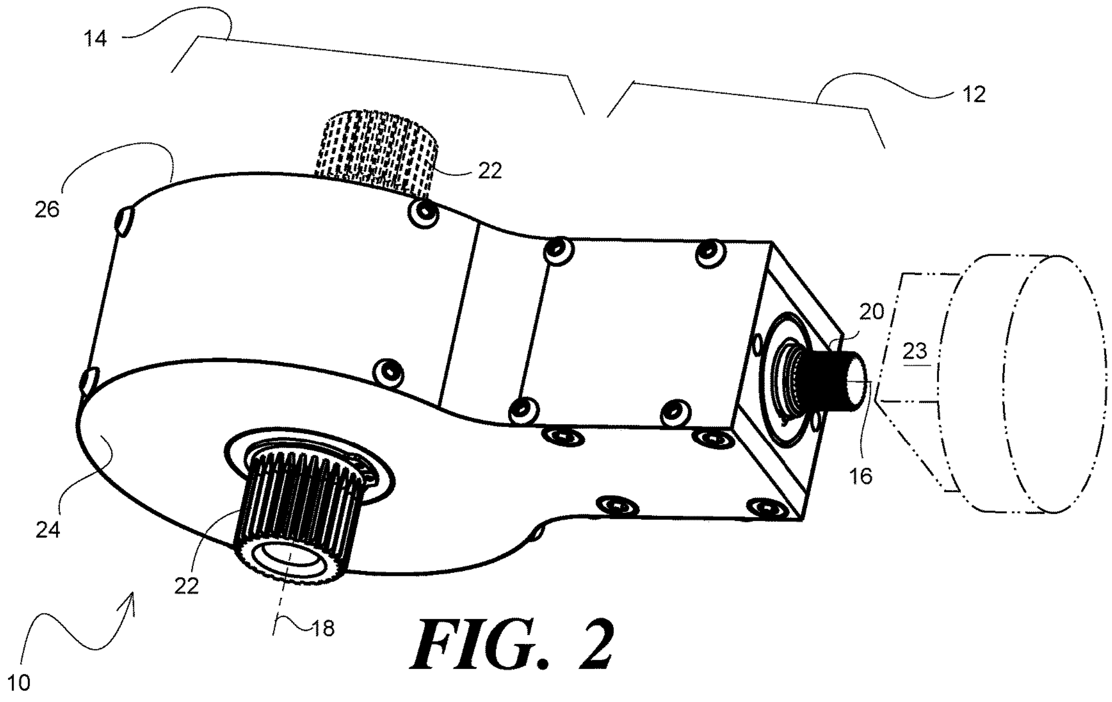

FIGS. 1 and 2 illustrate variations of an exemplary torque wrench ("wrench") 10 that can be used to loosen or tighten a fastener (e.g., a bolt having a head with internal and/or external engagement features—not shown). Wrench 10 may generally be divided into an input end 12 and an output end 14. Input end 12 may be configured to receive a continuous torsional input (e.g., from a manually operated lever or from an electric, hydraulic, or pneumatic motor), which is then transformed into a continuous torsional output at output end 14. The torsional input may be generally aligned with a first axis 16 of wrench 10, while the torsional output may be generally aligned with a second axis 18 that is substantially (e.g., within 0-10°) orthogonal to first axis 18. Input end 12 may include an engagement interface (e.g., a socket; a splined, torx, or square stub shaft; etc.) 20 configured to mate with a corresponding engagement interface of the lever or motor and receive the torsional input. Output end 14 may include one or more drive fittings 22 configured to mate directly with the bolt or with an adapter (not shown) to transmit the torsional output to the bolt.

In one embodiment, input end 12 of wrench 10 may not mate directly with the lever or motor described above. Instead, an optional engagement unit 23 may be disposed between wrench 10 and the lever or motor. Engagement unit 23 may be configured to selectively create a mechanical coupling between input end 12 and the lever or motor, for example based on a speed, pressure, flow rate, power, and/or other parameter associated with wrench 10 and/or the lever or motor. In one embodiment, the mechanical coupling of engagement unit 23 could be selectively interrupted, such that a hammering effect is created within wrench 10 that helps to loosen and/or tighten a corresponding fastener.

The torsional output at end 14 may be accessible from multiple different directions. For example, output end 14 may have a first access face ("face") 24 and a second access face ("face") 26. In the disclosed embodiments, faces 24 and 26 are oriented in opposition to each other and generally (e.g., within 0-10°) normal to second axis 18. Drive fitting 22 may extend through one or both of faces 24, 26, such that the bolt may be approached from either side of wrench 10. In the example of FIG. 1, drive fitting 22 is a socket (e.g., a hexagonal socket) having internal surfaces designed to fit directly over the head of the bolt or, alternatively, over a bolt-head adapter that then engages the bolt. In the example of FIG. 2, drive fitting 22 is a protrusion (e.g., a splined, torx, or square stub shaft) having external surfaces designed to fit into the head of the bolt or into the bolt-head adapter. It is contemplated that wrench 10 could include both a socket and a protrusion, for example one associated with each of faces 24, 26, if desired.

Figure 3:
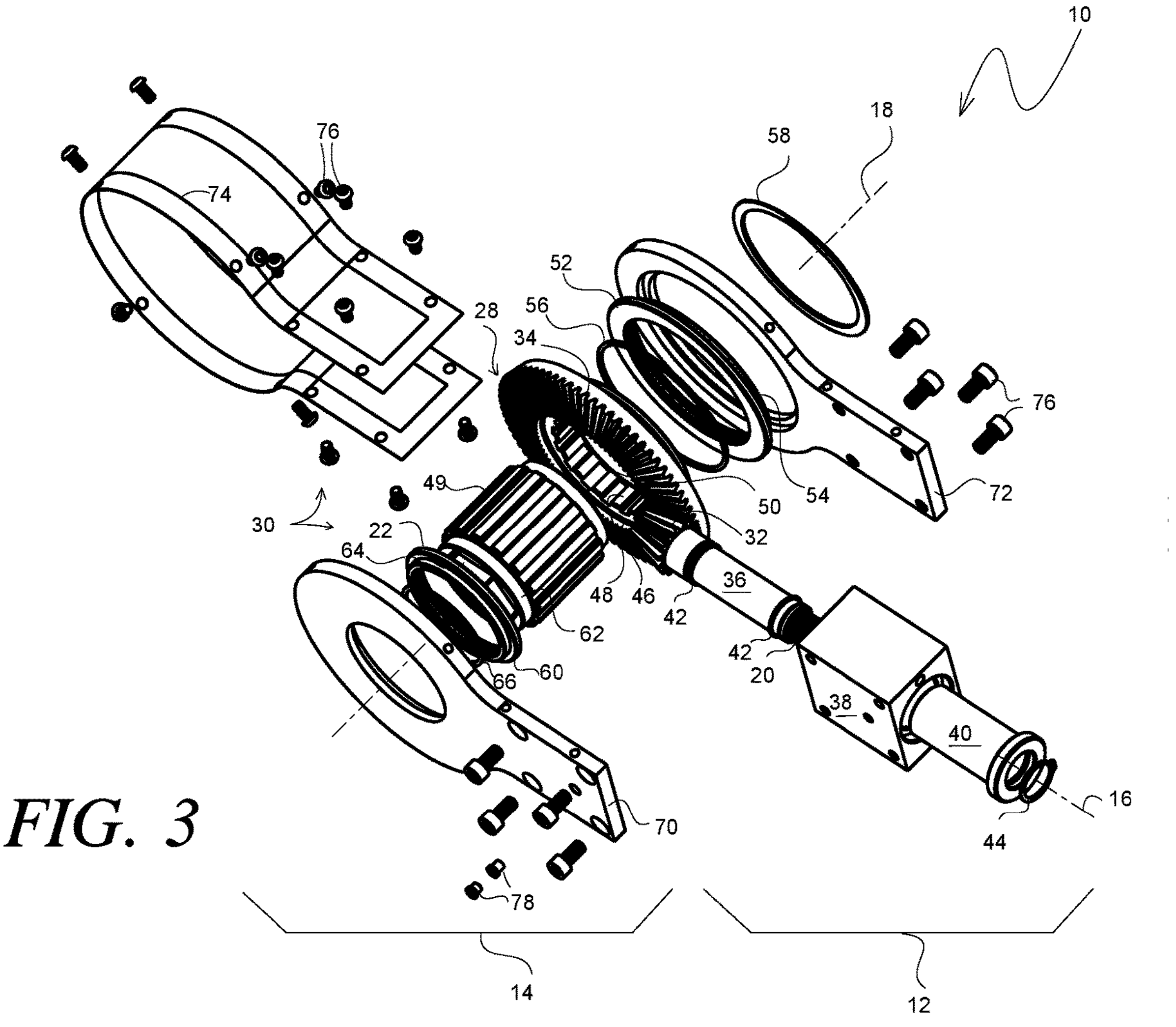
FIG. 3 is an exploded view illustration of the torque wrench of FIG. 1.

As shown in FIG. 3, wrench 10 may be assembly of multiple different components that cooperate to transfer torque received at input end 12 to output end 14. These components may include, among other things, a gear train 28, a housing 30 configured to support and enclose gear train 28, and a variety of hardware that retains and seals gear train 28 within housing 30.

Gear train 28 may include at least a pinion gear 32 and a crown gear 34. Pinion gear 32 may be formed at an end of a shaft 36 that extends to engagement interface 20, and may include a plurality of teeth that engage and drive corresponding teeth of crown gear 34. In the disclosed embodiment, the teeth of pinion gear 32 and crown gear 34 are beveled, such that pinion gear 32 may rotate about axis 16 while crown gear 34 rotates about axis 18. It is contemplated that the teeth of these gears could be straight and have a conical pitch (e.g., pinion gear 32 could be a straight bevel gear), curved and have a conical pitch (e.g., pinion gear 32 could be a spiral bevel gear), or curved and have a hypoid pitch (e.g., pinion gear 32 could be a hypoid bevel gear), as desired.

Pinion gear 32 may be supported within housing 30 by way of a bearing block 38. For example, a bearing (e.g., bushing, needle bearing, roller bearing, etc.) 40 may be disposed within bearing block 38 and configured to slidingly receive shaft 36 in an axial direction and to support rotation of shaft 36. One or more seals (e.g., o-rings or gaskets) 42 and/or retainers (e.g., circlips, snaprings, etc.) 44 may be used to seal and/or retain bearing 40 and/or shaft 36 in place within housing 30.

Crown gear 34 may have teeth extending toward an outer annular periphery, and include a central opening 46 with engagement features (e.g., internal splines, cogs, gear teeth, etc.) 48 formed therein. Features 48 may be configured to engage corresponding features 49 of drive fitting 22. It is contemplated that drive fitting 22 may pass completely through crown gear 34 via opening 46 (e.g., in a dual-sided wrench configuration—shown in FIG. 3) or terminate at crown gear 34 within opening 46 (e.g., in a single-sided wrench configuration—shown in FIG. 4), as desired.

A shoulder 50 may surround opening 46 at a back (i.e., non-toothed) side of crown gear 34 and function to position and support rotation of crown gear 34 within housing 30. A bushing 52 may be placed against the back side of crown gear 34 and around shoulder 50, and include a step 54 that passes through a corresponding opening within housing 30. A seal (e.g., o-rings or gaskets) 56 may be annularly sandwiched between bushing 52 and shoulder 50, and a retainer (e.g., a circlip, snapring, etc.) 58 may engage a corresponding groove in shoulder 50 to retain crown gear 34 in place.

A bushing 60 similar to bushing 52 (e.g., similarly shaped, but having a smaller diameter) may be placed around a shoulder 62 of drive fitting 22 at an opposite side of wrench 10, and include a step 64 that passes through a corresponding opening within housing 30. A seal (e.g., o-rings or gaskets) 66 may be annularly sandwiched between bushing 60 and shoulder 62.

In the example of FIG. 3, drive fitting 22 may have an axial length sufficient to provide internal clearance (see FIG. 5) for pinion gear 32. In particular, in this example, drive fitting 22 may function as a spacer that maintains a desired distance between opposing walls of housing 30.

Housing 30 may also be an assembly of multiple components. The components of housing 30 may include among other things, first and second plates 70, 72 oriented in opposition to each other, and a shroud 74 that wraps around edges of plates 70, 72 to surround and enclose gear train 28. Each of plates 70, 72 may be generally rectangular to match a size and shape of bearing block 38 at input end 12, and generally rounded and concentric with crown gear 34 at output end 14. The openings through which bushings 52 and 60 pass may be located at a general center of the rounded portions of plates 70, 72. Any number of fasteners 76 may be used to connect shroud 74 to the edges of plates 70, 72 and/or to connect plates 70, 72 to bearing block 38.

In one embodiment, wrench 10 may be sealed from the environment at an elevated or positive pressure. For example, one or more fittings (e.g., one-way valves) 78 may be connected to housing 30 (e.g., to one or more both of plates 70, 72) and configured to admit a lubricant (e.g., grease) into housing 30 without allowing escape of the lubricant. The lubricant may be pressurized, such that external contaminates (e.g., water, air, debris, etc.) do not enter housing 30. This may allow wrench 10 to be operated in harsh conditions (e.g., under water or in contaminated environments) without undue effects. The sealed nature of wrench 10, combined with an inherent low rotational speed and temperature, may also reduce maintenance requirements. In particular, the grease may be retained inside wrench 10 for a life of wrench 10 without significant degradation (e.g., because of the clean environment inside of sealed housing 30).

Figure 4:
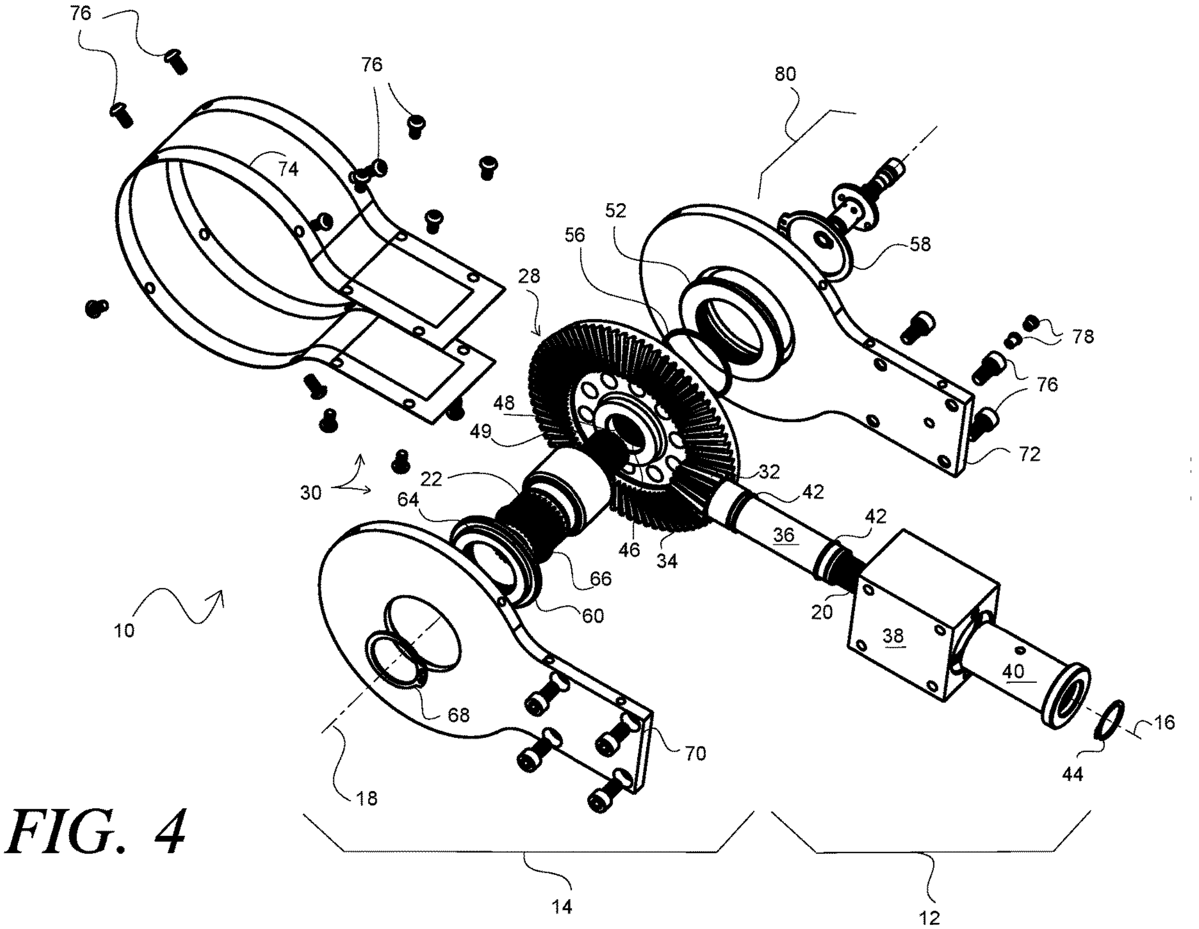
FIG. 4 is an exploded view illustration of the torque wrench of FIG. 2.

FIG. 4 illustrates a one-sided example of wrench 10. Like wrench 10 of FIG. 3, wrench 10 of FIG. 4 may also include gear train 28 supported within housing 30 by bearing block 38, bearing 40, bushing 52, and bushing 60. Wrench 10 of FIG. 4 may likewise include seals 56 and 66, and retainer 58. However, in contrast to wrench 10 of FIG. 3, wrench 10 of FIG. 4 may include an additional retainer 68 (e.g., a circlip, snapring, etc.) that engages a corresponding groove in drive fitting 22 to retain drive fitting 22 and crown gear 34 in place. In addition, drive fitting 22 of FIG. 4 is male and configured to extend from only one side of wrench 10 at output end 14. A retaining sub-assembly ("sub-assembly") 80 may be used at the closed or non-accessible side of wrench 10 to retain connection between drive fitting 22 and crown gear 34. Details of sub-assembly 80 are illustrated in FIG. 5.

Figure 5:
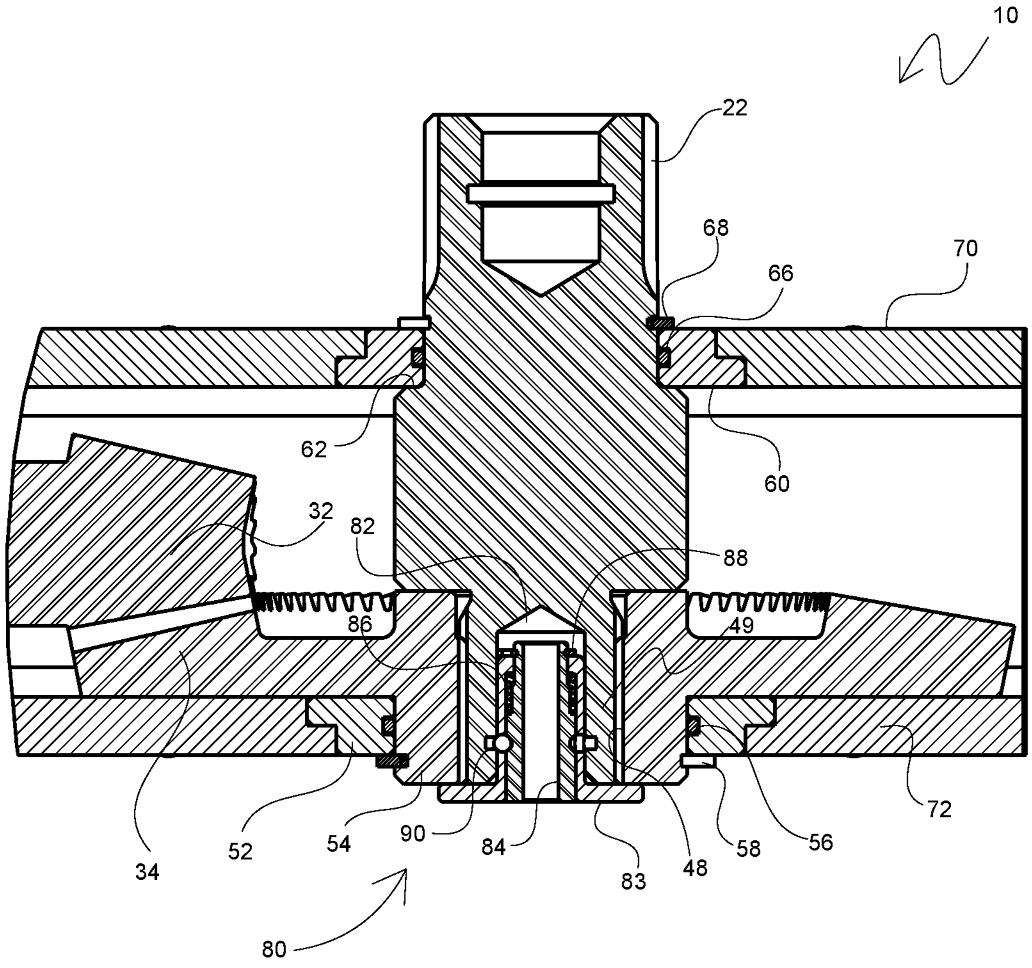
FIG. 5 is a cross-sectional view illustration of a portion of the torque wrench of FIG. 4.

As can be seen in FIG. 5, drive fitting may have a blind bore ("bore") 82 formed at an internal end that is configured to receive sub-assembly 80. Sub-assembly 80 may include, among other things, a locking housing ("housing") 83, a pin 84, a spring 86, a clip 88, and one or more balls 90. Housing 82 may be generally cylindrical and hollow, having a shaft that is received within bore 82 and an annular flange located at an exposed end that is configured to rest against shoulder 54 of crown gear 34. Pin 84 may pass a distance through the shaft of housing 82, and clip 88 may engage the protruding end to inhibit separation of pin 84 from housing 82. Spring 86 may be trapped inside of the shaft of housing 82, between an internal lip of the shaft of housing 82, and an external shoulder of pin 84. In this configuration, pin 84 may be pushed downward against a bias of spring 86, and the bias may urge pin 84 out of housing 82. However, pin 84 may not leave housing 82 due to the connection with clip 88. Balls 90 may rest in pockets co-formed by external recesses of pin 84 and internal recesses of housing 82. When sub-assembly 80 is placed into bore 80, balls 90 may be pushed outward and into engagement with corresponding recesses inside bore 80, such that a mechanical interference is created between balls 90, the walls of bore 90, and the walls of housing 82.

Figure 6:
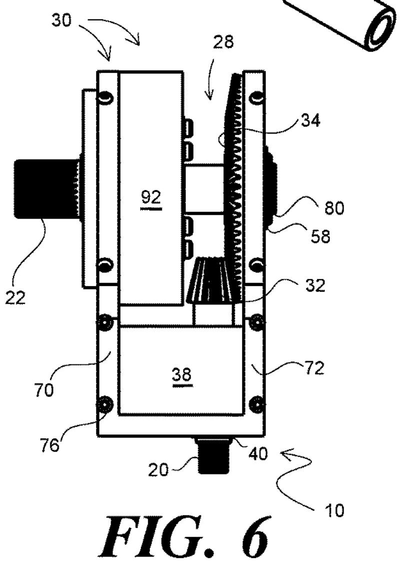
FIG. 6 is a cut-away view of another exemplary disclosed torque wrench.

FIG. 6 illustrates a modification of wrench 10 shown in FIGS. 4 and 5. In this embodiment, an internal torque multiplier 92 has been assembled inside housing 30 (note that shroud 74 has been made transparent for clarity) to increase the amount of torque transferred from crown gear 34 to drive fitting 20. As will be explained in more detail below, torque multiplier 92 may be received by crown gear 34 in the same manner that drive fitting 22 was received by crown gear 34 in the embodiment of FIGS. 4 and 5. In the embodiment of FIG. 6, drive fitting 22 may be received by torque multiplier 92.

Figure 7:
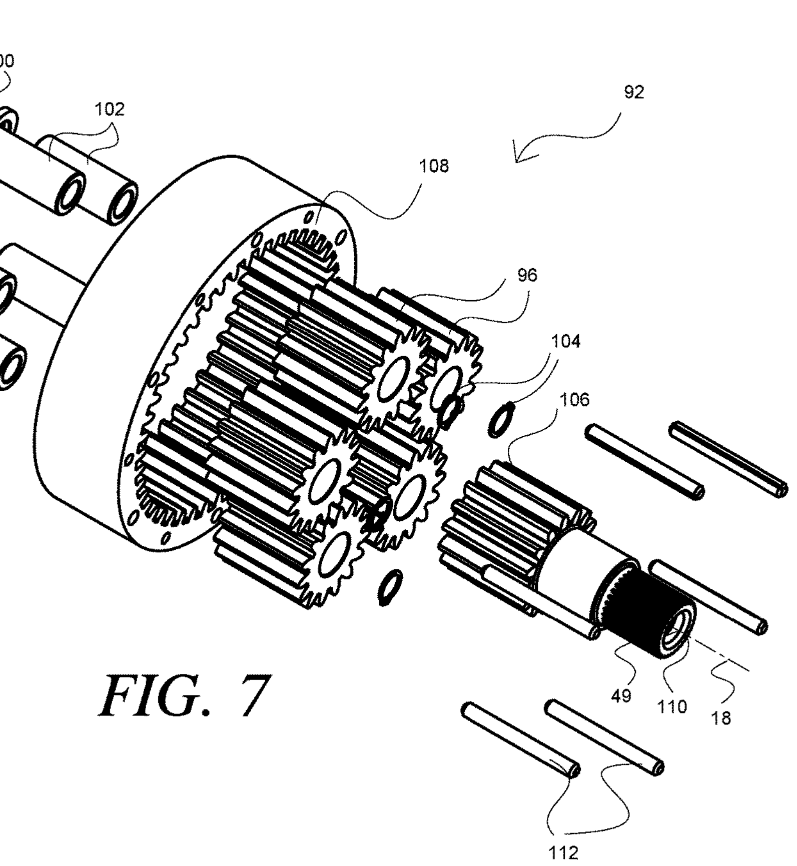
FIG. 7 is an exploded view illustration of an exemplary portion of the torque wrench of FIG. 6.

As shown in FIG. 7, torque multiplier 92 maybe a planetary gear arrangement that receives torque from crown gear 34, increases the torque, and transmits the increased torque to drive fitting 22. For the purposes of this disclosure, a planetary gear arrangement may have at least three elements, including a sun gear, a planet carrier having at least one set of connected planet gears, and a ring gear. The planet gears of the planet carrier mesh with the sun gear and the ring gear. One of the sun gear, planet carrier and ring gear is driven as an input, while another of the sun gear, planet carrier, and ring gear rotates as an output. A combination of the sun gear, planet carrier, planet gears, and ring gear can rotate simultaneously to transmit power from the input to the output at a desired ratio of speed-to-torque. The speed-to-torque ratio of the planetary gear arrangement depends upon the number of teeth in the sun and ring gears, the gear(s) that is selected as the input, the gear(s) that is selected as the output, and which gear, if any, is held stationary or rotationally locked with another gear.

In the exemplary embodiment of FIG. 7, torque multiplier 92 includes a single planet carrier 94 supporting five substantially identical (e.g., within engineering tolerances) planet gears 96 (e.g., via separate shafts 98, spacers 100, bushings 102, and retainers 104); a single sun gear 106, and a single ring gear 108. It should be noted that any number of planet gears 96 could be mounted to planet carrier 94, as desired. Sun gear 106 may be driven by crown gear 34 (e.g., via a male protrusion 110 having features 49 that engage corresponding features 48 inside of opening 46 of crown gear 34). Sun gear 106 may mesh with each of planet gears 96, which may in turn mesh with internal teeth of ring gear 108. Planet gears 96 may be connected to rotate together with planet carrier 94 about axis 18, and to also rotate on bushings 102 about shafts 98. Ring gear 108 may be held stationary within housing 30 (e.g., via one or more pins 112 that extend into plate 70 of housing 30, via fasteners 76, or via other similar devices). Planet carrier 94 may be connected to rotate drive fitting 22. Thus, as shown in FIGS. 6 and 7, the motion and power of crown gear 34 may be transmitted through torque multiplier 92 to drive fitting 22 via sun gear 106, planet gears 96, and planet carrier 94, with ring gear 108 being fixed and only affecting the speed-to-torque ratio of the motion. Because torque multiplier 92 is mounted inside housing 30, torque multiplier 92 may be sealed from the environment and pressurized in the same way that housing 30 seals and pressurizes gear train 28.

INDUSTRIAL APPLICABILITY

The torque wrench of the present disclosure has wide application in many different industries. The disclosed torque wrench may be used anywhere that fasteners are to be loosened or tightened with high-levels of torque and/or at high speed. For example, the disclosed torque wrench may be used in the oil and gas industry to join segments of a pipeline together.

The disclosed torque wrench may be capable of reliably producing high-levels of torque. In particular, the disclosed gear train inside of the wrench may allow for efficient torque transmission with little or no backlash. In addition, when the disclosed torque wrench is equipped with the optional torque multiplier, the torque capacity may be increased. It is contemplated that many different levels of torque capacity may be available depending on the gear ratio selected for the planetary gear arrangement. Finally, because the torque multiplier may rely on a planetary gear arrangement, the overall weight and size of the torque wrench may be small (e.g., because of nesting capabilities inherent to planetary gear arrangements).

The disclosed torque wrench may be capable of continuous 360° rotation. In particular, because the disclosed torque wrench does not rely on reciprocal motion, the torque wrench may not need to be continuously reset after only short segments of angular rotation. This may result in interruption free operation, allowing for high-speed loosening or tightening operations.

The disclosed torque wrench may be versatile. Specifically, because the disclosed torque wrench may be used with any power source (e.g., electrical, hydraulic, and/or pneumatic motor) and/or manually, the torque wrench may be used anywhere, at any time, and in any situation. In addition, the dual sided nature of the disclosed torque wrench may allow a bolt to be approached by the torque wrench from multiple directions.

Finally, the disclosed torque wrench may be simple and low-cost to maintain. In particular, because the disclosed torque wrench may be sealed and pressurized, the torque wrench may not need to be opened, cleaned, and/or lubricated frequently. In addition, the sealed and pressurized nature of the disclosed torque wrench may allow for usage in locations and/or conditions (e.g., underwater and/or in contaminated environments) not heretofore possible.

It will be apparent to those skilled in the art that various modifications and variations can be made to the torque wrench of the present disclosure without departing from the scope of the disclosure. Other embodiments will be apparent to those skilled in the art from consideration of the specification and practice of the torque wrench disclosed herein. It is intended that the specification and examples be considered as exemplary only, with a true scope of the disclosure being indicated by the following claims and their equivalents.

What is claimed is:

1. A torque wrench, comprising:

an input end configured to receive a torsional input;

a sealed housing containing pressurized lubricant;

a gear train disposed inside the housing and operatively driven by the torsional input;

an engagement unit configured to selectively create a mechanical coupling between the input end and a lever or motor; and an output end operatively driven by the gear train to produce a torsional output, wherein the gear train is sealed inside the housing from a surrounding environment at a positive pressure relative to the surrounding environment when the lubricant is inserted, wherein a unidirectional valve is connected to the housing and configured to pass the pressurized lubrication unidirectionally into the housing, and wherein the housing is sufficiently sealed and the positive pressure is sufficiently high to prevent water from passing through the unidirectional valve when the torque wrench is used underwater.

2. The torque wrench of claim 1, wherein the gear train includes a torque multiplier inside the housing and wherein the output end is operatively driven by the torque multiplier.

3. The torque wrench of claim 2, wherein the output end includes at least one female fitting driven by the torque multiplier to produce the torsional input.

4. The torque wrench of claim 2, wherein the output end includes at least one male fitting driven by the torque multiplier to produce the torsional output.

5. The torque wrench of claim 2, wherein the output end includes:

a female fitting driven by at least one of the gear train and the torque multiplier to produce a torsional output accessible via a first face; and a male fitting driven by at least one of the gear train and the torque multiplier to produce a torsional output accessible via a second face.

6. The torque wrench of claim 2, wherein the torque multiplier includes a planetary gear arrangement.

7. The torque wrench of claim 6, wherein the planetary gear arrangement includes:

a sun gear driven by a crown bevel gear;

a plurality of planet gears supported by a planet carrier and engaged with the sun gear; and a ring gear engaged with the plurality of planet gears;

wherein rotation of the planet carrier is the torsional input.

8. The torque wrench of claim 7, wherein the ring gear is rotationally fixed to the housing.

9. The torque wrench of claim 8, wherein the housing includes:

a first plate;

a second plate; and a shroud extending from the first plate to the second plate and substantially enclosing the gear train and the torque multiplier.

10. The torque wrench of claim 9, further including a bearing block configured to support the gear train and the input end, the bearing block being disposed between the first plate and the second plate inside of the shroud.

11. The torque wrench of claim 10, further including:

a bearing supported in the bearing block and configured to receive a portion of the gear train at the input end; and first and second bushings supported by the first and second plates, respectively, and configured to receive corresponding portions of the gear train and the torque multiplier at the output end.

12. The torque wrench of claim 1, wherein:

the torsional input is aligned with a first axis of the torque wrench; and the torsional output is aligned with a second axis of the torque wrench that is substantially orthogonal to the first axis.

13. The torque wrench of claim 1, wherein the gear train includes:

a pinion bevel gear driven by the torsional input; and a crown bevel gear driven by the pinion bevel gear.

14. The torque wrench of claim 13, further including a torque multiplier and a drive fitting configured to engage at least one of the crown bevel gear and the torque multiplier.

15. The torque wrench of claim 1, wherein the engagement unit is configured to intermittently connect the input end to a motor to create a hammering effect at the output end.

* * * * *